United States Patent Office 2,759,974
Patented Aug. 21, 1956

2,759,974
PREPARATION OF GUANIDINES FROM CYANATES OF ALKALI METALS AND SULFAMATES

Richard W. Hamilton, Darien, Conn., assignor to American Cyanamid Company, New York, N. Y., a corporation of Maine No Drawing. Application September 11, 1953,
Serial No. 379,733

1 Claim. (Cl. 260—564)

The present invention relates to the preparation of guanidine sulfate.

It has been found that when an alkali metal cyanate is heated with ammonium sulfamate, diammonium imidodisulfate, or triammonium nitrilotrisulfate at a temperature in the range of about 185° C.–350° C., guanidine sulfate is formed. Melamine is also formed at temperatures of 250° C. The preferred temperature for making guanidine by the process of this invention is about 200–250° C.

The following example illustrates the invention.

Example

A mixture of 82 parts of potassium cyanate and 228 parts of ammonium sulfamate were heated in an open vessel for 2 hours at 210° C. The reaction mass was then cooled, leached with 500 ml. cold water, and 71.5 g. guanidine sulfate recovered from the leachate by fractional crystallization.

Instead of ammonium sulfamate, its deammoniation products, i. e., diammonium imidodisulfate and triammonium nitrilotrisulfate can also be used. The ratio of reactants is not critical, but preferably at least two moles of sulfamate or equivalent should be used per mole of alkali metal cyanate.

The time of reaction is not critical and depends largely on the ability of the apparatus to transfer heat into the reaction mass. With good heat transfer, only a few minutes may be required, particularly in the higher temperature ranges.

I claim:

A method of preparing guanidine sulfate which comprises heating together at substantially atmospheric pressure an alkali metal cyanate and a member selected from the group consisting of ammonium sulfamate, diammonium imidodisulfate and triammonium nitrilotrisulfate at a temperature within the range of from about 200° C. to about 250° C., and recovering thus-formed guanidine sulfate from the reaction mixture.

References Cited in the file of this patent
UNITED STATES PATENTS
2,566,231    Paden _____ Aug. 28, 1951

FOREIGN PATENTS
583,504    Great Britain _____ 1946
628,255    Great Britain _____ 1949

OTHER REFERENCES
Degering: "An Outline of Org. Nitrogen Compounds," page 532 (1945).